United States Patent [19]

Jones

[11] Patent Number: 5,370,357
[45] Date of Patent: Dec. 6, 1994

[54] NEEDLE VALVE WITH DEFORMABLE SEAL

[75] Inventor: Thomas C. Jones, Columbia, Md.

[73] Assignee: Ohmeda Inc., Liberty Corner, N.J.

[21] Appl. No.: 162,721

[22] Filed: Dec. 3, 1993

[51] Int. Cl.⁵ .................... F16K 1/38; F16K 47/04
[52] U.S. Cl. .................... 251/122; 251/332; 251/903
[58] Field of Search ............... 251/122, 903, 332

[56] References Cited

U.S. PATENT DOCUMENTS

| | | | |
|---|---|---|---|
| 2,917,271 | 12/1959 | Banks | 251/122 |
| 3,071,344 | 1/1963 | Banks | 251/332 X |
| 3,272,218 | 9/1966 | Johnson | 251/332 X |
| 3,327,991 | 6/1967 | Wallace | 251/332 X |

*Primary Examiner*—Arnold Rosenthal
*Attorney, Agent, or Firm*—Roger M. Rathbun; Larry R. Cassett

[57] ABSTRACT

A needle valve including a deformable seal positioned between the distal end of the needle and a hard, mechanical seat between the needle and the valve housing. The deformable seal is able to seal around the movable needle but is protected from serious deformation by the hard mechanical seat that is located so as to prevent the needle from entering the deformable seat beyond a predetermined amount. Thus the deformable seal does not extrude due to the entrance of the needle and wear is reduced.

6 Claims, 2 Drawing Sheets

NEEDLE VALVE WITH DEFORMABLE SEAL

BACKGROUND OF THE INVENTION

This invention relates to flow control valves, and more particularity, to a needle valve having a deformable seal that sets against and seals against the needle when the needle is moved to the closed position and where the normal hard seat prevents the needle from overly deforming the deformable seal.

Needle valves are used in a wide variety of applications where precision and accuracy are needed in controlling the flow of a fluid. In such typical current needle valves, the needle is a tapered member that is rotated by the user and such rotation causes the needle to move with respect to its seat by virtue of a threaded engagement of the needle with the valve housing. As the needle moves with respect to its seat, the flow of the fluid is controlled.

It is obviously important, therefore, that the needle be sealed in its closed position against the valve housing so that there is no leakage through the valve. Various types of seals have been used in such valves, some of which are part of the needle itself and are deformable or pliant and which seal against the internal hard surface of the valve passageway.

Other seals are affixed to the internal surface of the valve passageway but are secured by complex and expensive means such as sealing rings, retainers and the like. Typical of all such seals in the needle valves, however is the problem of seal wear. The present seals are compliant or deformable in order to effect the seal against a hard surface and in the conventional valves, the seals are therefore deformed as the seal is effected.

One of the difficulties, therefore, is in the continued deformation of such seals since they tend to become permanently deformed and therefore need to be replaced. Alternatively, such seals are deformed beyond their elastic limits and thereafter lose their resilience through continual deformation and fail to properly seal against the hard surface.

Typical of the prior art valves are shown and described in Bowen et al, U.S. Pat. No. 3,233,863 where a flexible packing ring, such as an O-ring is used to seal against the tapered movable valve member. Also typical of prior art valve seals is Carlson et al, U.S. Pat. No. 3,471,123 where a resilient seat ring seals against a tapered valve member and which is held in position by retainer.

SUMMARY OF THE INVENTION

The needle valve of the present invention overcomes the aforedescribed difficulties by providing a valve wherein the a deformable seal is positioned within the inner surface of the valve passageway and which therefore seals against the needle when the needle is moved to its closed position sealing the passageway from the flow of fluid. In the preferred embodiment, the deformable seal is made of chlorotrifluoroethylene available under the trademark Kel-F ®. Alternatively nylon may be used or Delrin ® acetal plastic material substituted.

The deformation of the deformable seal is, however, controlled and is kept of a minimum by positioning the seal in a predetermined position with respect to the normal seating or bottoming out of the needle against a hard seat within the passageway.

In particular, the needle valve of the present invention retains a normal metal to metal mechanical seat, thereby having a hard seat and which bottoms out the needle in the closed position and preventing further movement of the needle toward the closed position.

By positioning the deformable seal in a particular predetermined position along the needle, a seal may be affected between a surface of the needle and the deformable seal at the precise time that the needle bottoms out by having the hard metal surfaces of the seat and needle contact each other. Thus the deformation of the deformable seal is curtailed or controlled since the needle is prevented from exerting any large force against the seal to deform the same. That is, the deformation is controlled to a predetermined amount by physically effecting a hard seat such that the needle seals against the deformable seal but cannot be forced further into that seal to cause excess or harmful deformation.

The deformable seal of the present invention is therefore always only a seal and is not a seat to halt further movement of the needle toward its closed position. The seal acts in concert with the hard seat in a combination, that is, the hard seat prevents further movement of the needle in the direction that would deform the seal such that the seal is never over-deformed. The deformable seal of the present invention is preferably inserted into the valve housing in the direction the movable valve member moves toward its closed position. Thus, in closing, the deformable seal is forced into the valve housing and is more firmly positioned, rather than being forced away from its seated position as the valve is closed.

Further, the spreading action of the tapered needle against the deformable seal captured between the needle and the seat tends to improve the press fit of the deformable seal into the seat as the seat wears, thereby insuring seal retention in the seat without other means, thus the use of a retaining ring or other similar acting means is eliminated.

In addition, the volume of the cavity formed between the hard seat and the needle is approximately the same as the volume of the deformable seal. Thus, undesirable extrusion of the deformable seal into other areas is prevented.

Because the volume of such cavity and volume of the deformable seal are substantially the same, deformation beyond the elastic limit of the deformable seal is limited and compliant, leak-free sealing is obtained over a long valve life.

The foregoing and other advantages and features of the present invention will become readily apparent from the following description.

BRIEF DESCRIPTION OF THE DRAWINGS

The invention is diagrammatically illustrated by way of example in the drawings appended hereto, in which.

DESCRIPTION OF THE PREFERRED EMBODIMENT

Figure 1:
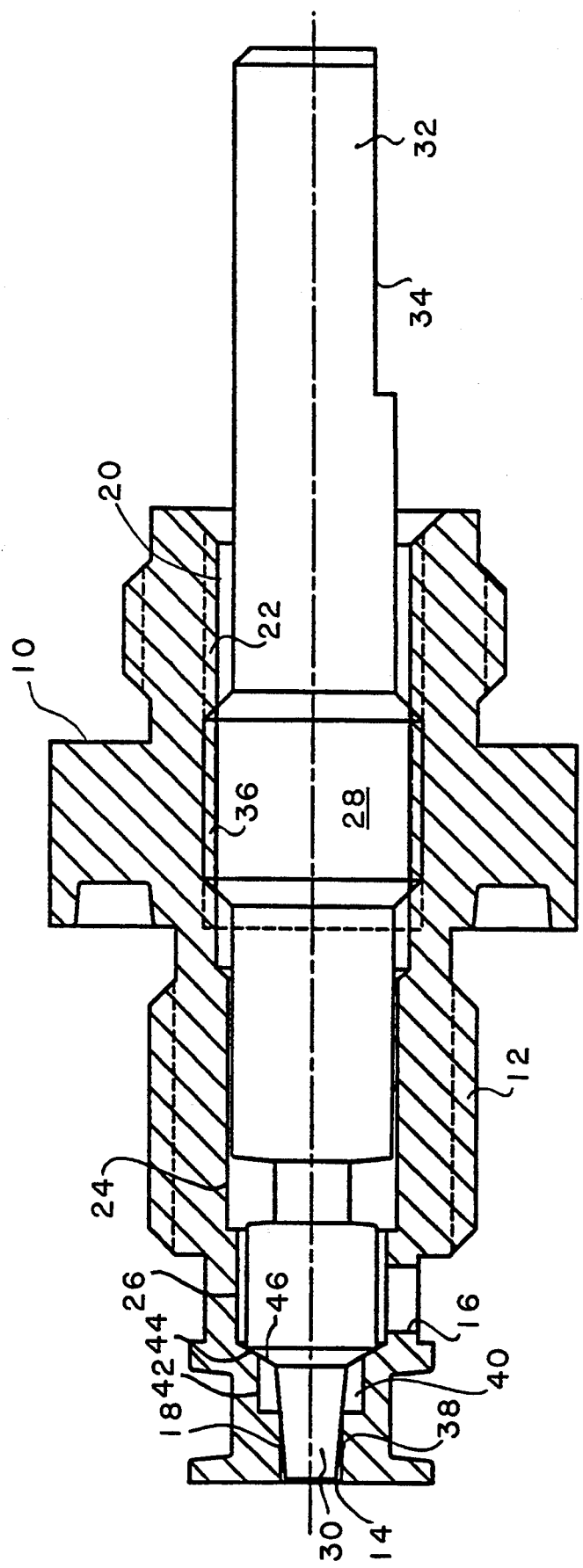
FIG. 1 is a cross sectional view of a needle valve constructed in accordance with the present invention in the closed position.
Figure 2:
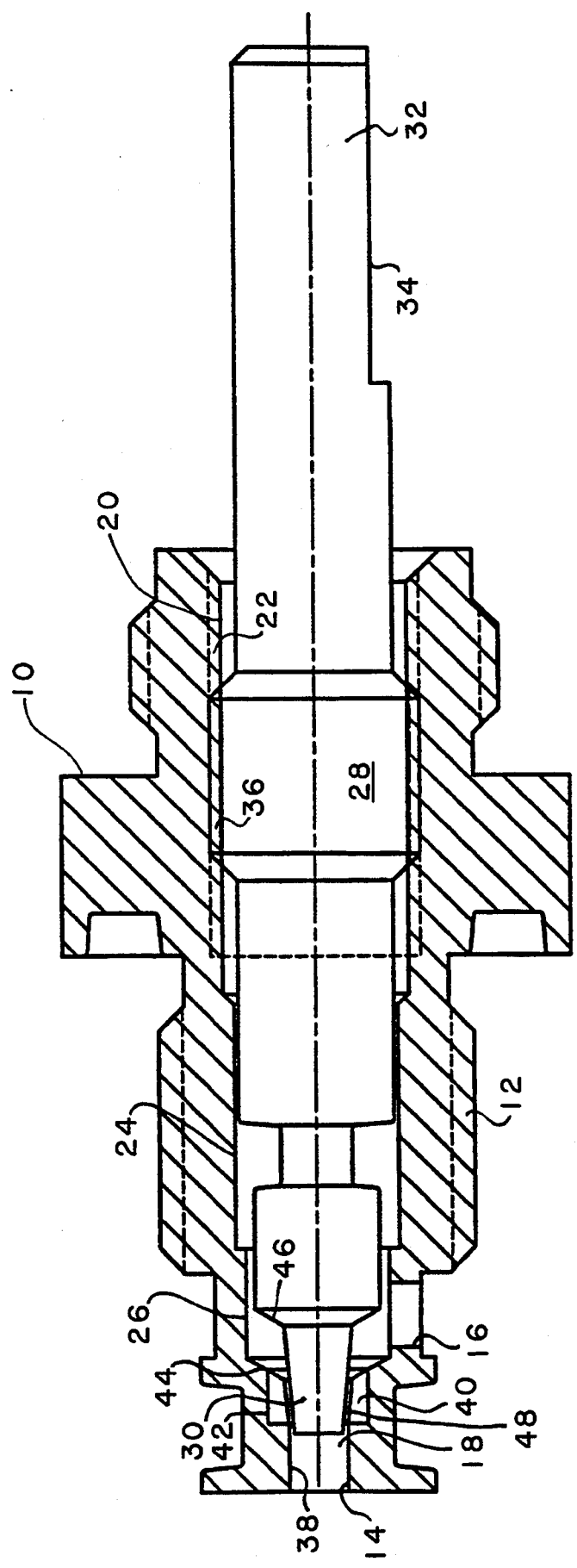
FIG. 2 is a cross sectional view of the needle valve of FIG. 1 as shown in the open position.

In FIGS. 1 and 2, there is shown cross-sectional views of a needle valve in its closed and open positions, respectively and constructed in accordance with the present invention. The needle valve includes a valve housing 10 constructed preferably of a brass alloy material. External threads 12 are formed on the exterior of the valve housing 10 and are used to affix the valve housing 10 to a valve block having the appropriate passageways (not shown) to conduct the fluid to and from the needle valve. As used herein, the end of the needle valve that is to be affixed to the valve block will be referred to as the distal end and the opposite end referred to as the proximal end and such designations shall apply to all components to be described herein.

An inlet 14 is formed in the distal end of the needle valve and an outlet 16 is formed in the lateral part of the needle valve, thus forming a passageway 18 communicating within the needle valve between the inlet 14 and the outlet 16 for the passage of the fluid to be controlled.

At the proximal end of valve housing 10, there is formed an outer bore 20 having internal threads 22. A further intermediate bore 24 having a lesser diameter then outer bore 20 is also formed within the valve housing 10 and an inner bore 26 is also formed of a still lesser diameter.

A needle 28 is provided within the valve housing 10 and has a tapered distal end 30 which is tapered at a specific angle and within certain tolerances. The proximal end 32 of needle 28 extends outwardly from the valve housing 10 and may have a flat surface 34 to which a knob may be affixed for the user to grip and rotate needle 28. Needle 28 also includes external threads 36 which interfit with the internal threads 22 within the outer bore 20 such that the rotation of the proximal end 32 of the needle 28 moves the needle 28 axially within the valve housing 10.

Returning to the tapered distal end 30 of the needle 28, the flow of fluid between the inlet 14 and the outlet 16 passes through the passageway 18 which is formed in the valve housing 10. That passageway 18 is formed within the metal cylindrical portion 38 at the distal end of the needle valve and partially, proximal thereto, within a deformable seal 40 of a material that is pliant and thus deformable. One preferred material for deformable seal 40 is a polymer known as Kel-F ® brand of chlorotriflouroethylene. The deformable seal 40 is preferably press fit into an annular recess 42 formed in the valve housing 10. It should be noted that one of the advantages of the installation of the deformable seal 40 is that it can be readily press fit in the direction that the needle 28 moves in progressing toward its closed position of FIG. 1. Thus the deformable seal 40 tends to be pressed more securely into its seated position as the needle valve is closed. The advantage is that no retaining ring or other means is required to keep the deformable seal 40 in its operating position.

As noted in FIG. 1, where the needle valve is in the closed position, the deformable seal 40 surrounds and forms a seal around the tapered distal end 30 of the needle 28 preventing leakage of fluid between the inlet 14 and the outlet 16. In the preferred embodiment, the internal surface of the deformable seal 40 is frustro-conically shaped and which seals around a tapered surface of the tapered distal end 30. As such, as the deformable seal 40 wears, it retains the same angle of taper as the tapered end 30 of needle 28 and linearity of the needle valve is retained despite the normal wear. The effect of normal wear is also reduced since the channel formed between the tapered end 30 and the deformable seal 40 is a long annular channel and those mating components have a large area of contact, thus spreading the wear over the entire internal surface of the deformable seal 40.

As can also be seen in the FIGS., a valve seat 44 is formed in the valve housing 10 just proximal to the deformable insert 40. That valve seat 44 is of a metallic material, being formed in the metallic material of the valve housing 10 and is preferably conically tapered. A complementary tapered surface 46 is shaped in the needle 28 and in the closed position of FIG. 1, the tapered surface 46 of the needle 28 abuts against the hard valve seat 44 and provides a bottom to further advancement of the needle into the passageway 18, thus also into the deformable seal 40.

In FIG. 2, where the valve is in the open position, the deformable seal 40 remains in its normal position fitted within annular recess 42 however it's inner surface 48 has a slight taper that is made complementary to the taper of the needle 28 by continual wear as the needle valve is used.

When the needle valve of the present invention is utilized, and it is desired to fully close the passageway 18 to the passage of fluid, the needle 28 is rotated until the tapered surface 46 abuts against the hard valve seat 44. At this point, the two metallic surfaces are in contact, that of the needle comprised of steel or brass and the valve seat comprised of a brass alloy material. Thus the further advancement of the needle 28 toward passageway 18 is prevented and the movement of needle 28 is bottomed out. By design, the distance between the deformable seal 40 and the point of contact between the tapered surface 46 an the valve seat 46, is predetermined such that the tapered distal end of the needle 28 comes into sealing contact with the deformable seal 40 but is prevented from contacting the deformable seal 40 with sufficient force to cause excessive distortion.

Thus the deformable seal 40 is positioned between the hard, mechanical seat and the distal end of the passageway 18 and is able to act as a only as a seal when the needle valve is in the closed position since the mechanical closure of the passageway 18 takes place between the valve seat 44 and the tapered surface 46 of needle 28. The deformable seal 40 thus is not continually distorted or caused to wear as the needle moves with respect thereto and it sealing properties can be utilized without the deleterious effect of excessive wear and deformation that would otherwise change the valve characteristics or performance over a period of time.

It should be noted that the deformable seat takes up substantially all of the volume of the area between the hard, mechanical seat and the tapered distal end 30 of the needle 28.

In taking up substantially all of that volume, the deformable seal 40 is thus not extruded when the valve is in the closed position of FIG. 1, but instead retains its configuration and is not strained beyond the elastic limit such that permanent distortion could occur.

Thus, by filling that volume, and by positioning the deformable seal 40 at a precise distance along the needle 28 with respect to the hard seat formed between the tapered surface 46 of needle 28 and surface 44 of valve housing 10, the deformation of deformable seal 40 is controlled and is not deformed so as to exceed the elastic limit or be extruded out of its normal annular recess 42.

I claim:

1. A needle valve for controlling the flow of a fluid, said needle valve comprising a valve housing having an inlet and an outlet and defining a passageway therebetween for the flow of fluid between said inlet and said outlet, a hard seat formed in said housing and within said passageway, a needle having a tapered distal end, an annular, frustro-conical shaped deformable seal affixed within said valve housing and retained in position solely by a press fit within said valve housing, said deformable seal surrounding said tapered distal end of said needle and being tapered complementary to the taper of said distal end of said needle, said needle having a hard tapered surface formed therein proximal to said tapered distal end, said needle being movable between an open position where fluid passes through said passageway and a closed position where said hard seat formed in said housing abuts against said hard tapered surface formed on said needle to close said passageway, said movement intermediate said open and closed positions causing said tapered distal end to move away from and toward said deformable seal to meter the flow of fluid passing through said passageway, said deformable seal sealing against said tapered distal end of said needle when said needle is in the closed position, said deformable seal located such that movement of said needle further toward said deformable seal is prevented by the abutment of said hard tapered surface of said needle against said hard seat when said needle is in said closed position whereby deformation of said deformable seal by said tapered distal end is controlled to a predetermined amount.

2. A needle valve as defined in claim 1 wherein said deformable seal is comprised of chlorotriflouroethylene.

3. A needle valve as defined in claim 1 wherein said deformable seal is frustro-conical shaped and conforms to said tapered distal end of said needle.

4. A needle valve as defined in claim 1 wherein said hard seat formed within said housing and said hard tapered surface formed in said needle are complementary meeting tapered surfaces.

5. A needle valve as defined in claim 1 wherein said deformable seal wears to conform to the surface of said distal tapered end of said needle.

6. A needle valve as defined in claim 1 wherein said deformable seal occupies substantially the entire volume of space between said hard seat and said tapered distal end of said needle when said needle valve is in the closed position.

* * * * *